(12) United States Patent
Kawauchi et al.

(10) Patent No.: US 8,238,331 B2
(45) Date of Patent: Aug. 7, 2012

(54) COMMUNICATION SYSTEM AND TELEPHONE EXCHANGE APPARATUS

(75) Inventors: Yoshihiro Kawauchi, Hino (JP); Shuichi Sato, Sagamihara (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/975,181

(22) Filed: Dec. 21, 2010

(65) Prior Publication Data
US 2011/0158224 A1 Jun. 30, 2011

(30) Foreign Application Priority Data
Dec. 25, 2009 (JP) ................................ 2009-296139

(51) Int. Cl.
*H04L 12/66* (2006.01)
*H04L 12/28* (2006.01)
*G06F 9/00* (2006.01)
(52) U.S. Cl. ........................... 370/356; 370/392; 726/12
(58) Field of Classification Search ........................ None
See application file for complete search history.

(56) References Cited

U.S. PATENT DOCUMENTS

| | | | | |
|---|---|---|---|---|
| 6,650,641 | B1 * | 11/2003 | Albert et al. | 370/392 |
| 7,143,188 | B2 * | 11/2006 | Maufer et al. | 709/245 |
| 7,197,035 | B2 * | 3/2007 | Asano | 370/392 |
| 7,478,169 | B2 * | 1/2009 | Banerjee et al. | 709/245 |
| 7,787,459 | B2 * | 8/2010 | Yuan et al. | 370/392 |
| 2002/0085561 | A1 * | 7/2002 | Choi et al. | 370/392 |
| 2007/0097989 | A1 | 5/2007 | Sato | |
| 2007/0162968 | A1 * | 7/2007 | Ferreira et al. | 726/12 |

FOREIGN PATENT DOCUMENTS

| | | |
|---|---|---|
| JP | 2002-319961 | 10/2002 |
| JP | 2005-252809 | 9/2005 |
| JP | 2006-074302 | 3/2006 |
| JP | 2007-124486 | 5/2007 |
| JP | 2007-214989 | 8/2007 |
| JP | 2008-172552 | 7/2008 |

OTHER PUBLICATIONS

Japanese Patent Application No. 2009-296139; Notice of Reasons for Rejection; Mailed Mar. 15, 2011 (English translation).

* cited by examiner

*Primary Examiner* — Melanie Jagannathan
(74) *Attorney, Agent, or Firm* — Blakely, Sokoloff, Taylor & Zafman LLP

(57) ABSTRACT

According to one embodiment, a communication system includes a Network Address Translator (NAT) rooter and a telephone exchange apparatus. The NAT router comprises a transfer module configured to transfer a communication packet brought from the global network to the telephone exchange apparatus. The telephone exchange apparatus comprises a memory configured to store a map table in which a terminal ID specifying the terminal, and an address and a port number specifying the network are correlated with each other, and a controller configured to refer to the map table, and notify the terminal connected to the global network of an address and a port number of the telephone exchange apparatus's own apparatus as an address and a port number of the communication partner, and bring the communication path between the terminals into the apparatus.

9 Claims, 6 Drawing Sheets

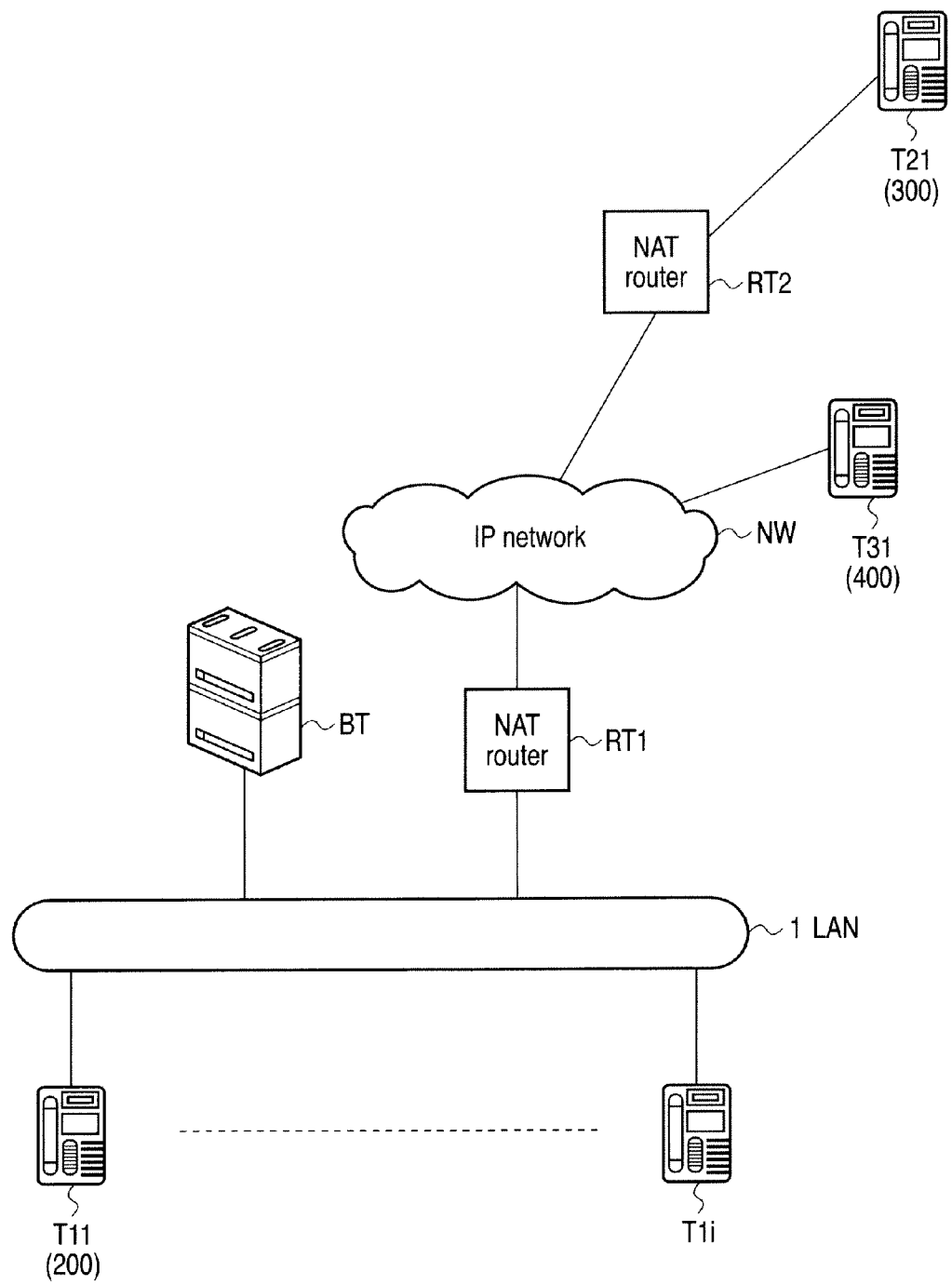
F I G. 1

| Extension number | External IP address | Internal IP address | Location |
|---|---|---|---|
| 300 | 159.119.115.10 | 172.16.37.10 | NAT network |
| 400 | 159.119.115.100 | 159.119.115.110 | Global network |
| 200 | 192.168.254.5 | 192.168.254.5 | Local network |
| 201 | 192.168.254.6 | 192.168.254.6 | Local network |
| 202 | 192.168.254.7 | 192.168.254.7 | Local network |

| IP packet relay resource number | Local IP address and port number of resource | | Global IP address and port number | | Dispatch extension number | Relay destination terminal number |
|---|---|---|---|---|---|---|
| 1 | 133.114.1.10 | 1500 | 192.168.254.10 | 1500 | 300 | 200 |
| 2 | 133.114.1.10 | 1501 | 192.168.254.10 | 1501 | 200 | 300 |
| | | | | | | |

| Extension number | Voice packet transmission destination information | |
|---|---|---|
| | IP address | RTP port number |
| 200 | 192.168.254.5 | 1500 |
| 201 | | |
| 203 | | |
| 300 | 159.119.115.10 | 11500 |
| 400 | | |
| | | |

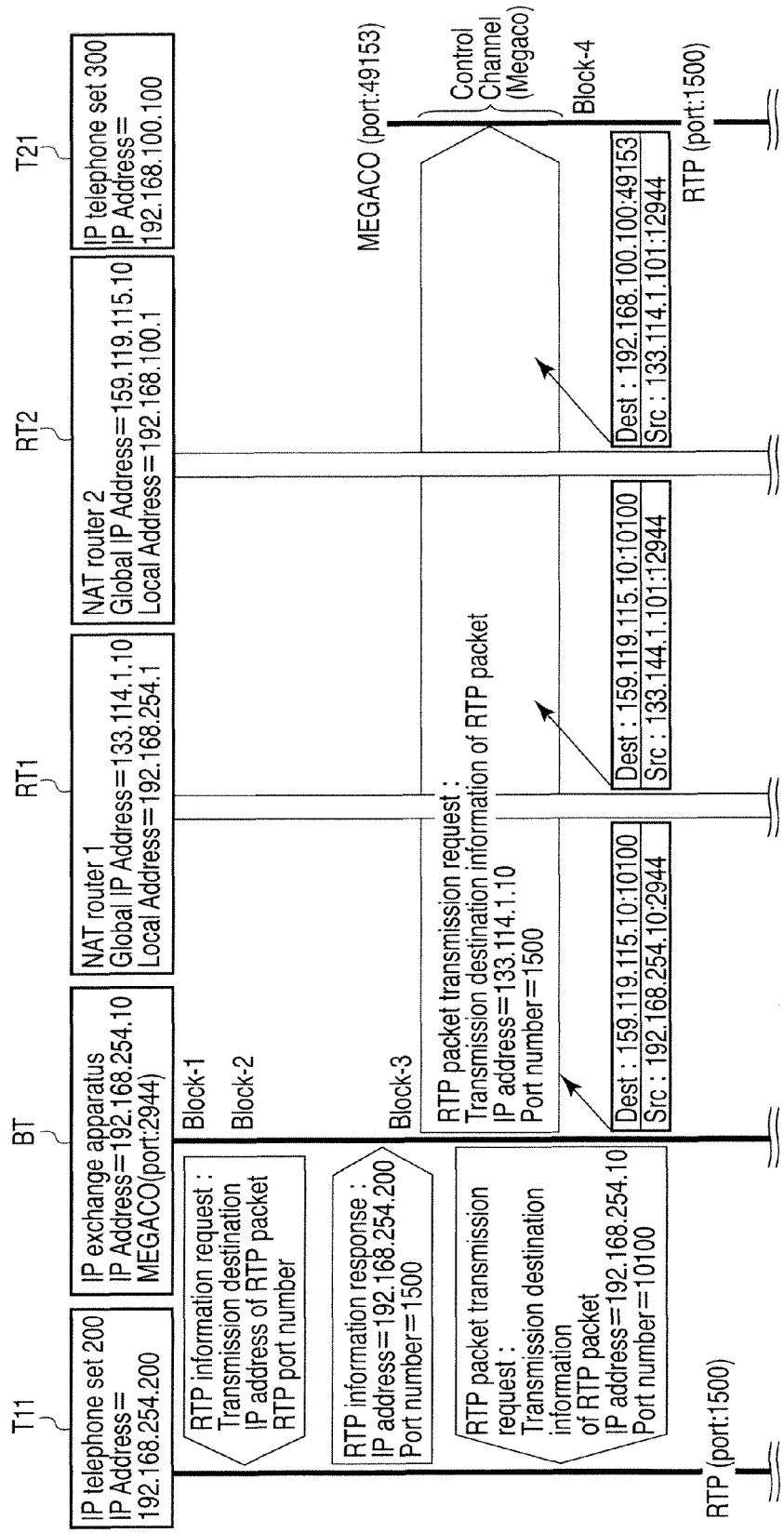
F I G. 8A

COMMUNICATION SYSTEM AND TELEPHONE EXCHANGE APPARATUS

CROSS-REFERENCE TO RELATED APPLICATIONS

This application is based upon and claims the benefit of priority from Japanese Patent Application No. 2009-296139, filed Dec. 25, 2009; the entire contents of which are incorporated herein by reference.

FIELD

Embodiments described herein relate generally to a system configured to carry out voice communication between terminals through an IP network, such as an Internet Protocol (IP) telephone system or the like, and more particularly, to a communication system configured to carry out communication between a terminal connected to a global network, and terminal connected to a private network, and telephone exchange apparatus used in the communication system.

BACKGROUND

In recent years, an IP telephone system configured to transmit/receive an image or voice as packet data bidirectional through an IP network in real time has become widespread. In this IP telephone system, a plurality of IP telephone terminals are accommodated in a private network such as a Local Area Network (LAN) or the like, the private network is connected to a global network such as a public network, Internet or the like through a router, and the router enables multimedia information communication between IP telephone terminals or between an IP telephone terminal and global network by carrying out address translation or the like.

Incidentally, a Network Address Translator (NAT) function is incorporated in the above system. The NAT function implies a function of translating a private address into a global address to transmit the global address as a transmission source IP address by using an IP address previously assigned for a connection purpose, and translating a global address of a destination IP address supplied by reception into a private address.

Incidentally, in the above system, at the communication time, when an inquiry is made about information on a voice channel used by a terminal on the control channel, an IP address and port number in a header area of the response packet are translated, whereas an IP address and port number in a data area of the packet, and used as a voice port are not translated by the NAT router. As a result of this, when a terminal which has received this packet tries to return voice data to the transmission source of the packet by using the IP address and port number in the data area of the packet, the terminal cannot correctly designate the destination, and it becomes substantially impossible to carry out communication.

The reason why the IP address and port number in the data area of the packet are not translated is that the fundamental function of the router is to translate an IP address and port number in the IP header in the packet.

On the other hand, as a network apparatus configured to translate IP addresses and port numbers in the areas including the data area when data is to be transferred, there is an application layer gateway (ALG). The ALG is compatible with a specific protocol such as SIP (Session Initiation Protocol), and translates, for example, an IP address and port number in a data area of a SIP packet.

However, the ALG makes only specific protocols such as the SIP the targets of address translation, and is expensive, and hence there is the problem that the cost burden is too heavy for introduction thereof into a small office.

It should be noted that as a relevant technique, a telephone exchange system in which a SIP telephone apparatus and router are connected to a LAN, and a telephone under the SIP telephone apparatus communicates with an SIP telephone connected to an ISP network through the router and SIP telephone apparatus is proposed (for example, Jpn. Pat. Appln. KOKAI Publication No. 2008-172552).

Incidentally, the telephone exchange system described above is premised on peer-to-peer communication, and is configured in such a manner that in order to accommodate a plurality of SIP external line trunks, a SIP wait port number is assigned to each carrier, and the SIP wait port number, and an IP address of the router configured to carry out routing toward the SIP carrier are correlated with each other so that SIP message communication between the carrier and IP exchange apparatus can be divided into communications for carriers.

On the other hand, although a system in which an IP voice packet is guided from an IP telephone in an external network to an NAT router, and is brought to an IP telephone of a communication partner by a port forwarding function of the NAT router is also conceivable, forwarding setting is required for all of IP telephones placed on the local network with respect to a forwarding table of the NAT router.

Further, although a system in which by providing an IP telephone apparatus and media gateway apparatus on a global network, an IP voice packet is passed from the inside of an NAT router to the outside there through, the IP voice packet is drawn into a media gateway, and the voice is relayed, whereby NAT router traversal is provided is also conceivable, it is necessary to place an IP telephone apparatus on the global network, and it is also necessary to prepare a global IP address.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

FIG. 1 is a schematic configuration view showing a communication system according to an embodiment.

FIG. 8A is a view showing an example of a sequence of a case where IP telephones arranged on two different networks carry out telephonic communication through an IP network and NAT routers.

DETAILED DESCRIPTION

Various embodiments will be described hereinafter with reference to the accompanying drawings. In general, according to one embodiment, a communication system includes a Network Address Translator (NAT) router and a telephone exchange apparatus. The NAT router connects a private network, and a global network which is arranged in an area broader than the private network. The telephone exchange apparatus is connected to the private network, and establishes communication between the terminals. Wherein the NAT router comprises a transfer module configured to transfer a communication packet brought from the global network to the telephone exchange apparatus. The telephone exchange apparatus comprises a memory configured to store a map table in which a terminal ID specifying the terminal, and an address and a port number specifying the network are correlated with each other, and a controller configured to refer to the map table in communication connection between the terminals, and notify the terminal connected to the global network of an address and a port number of the telephone exchange apparatus's own apparatus as an address and a port number of the communication partner, and bring the communication path between the terminals into the apparatus, when there is the NAT router between the plurality of terminals connected to each other by the communication based on a reference result of the map table.

FIG. 1 is a schematic configuration view showing a communication system according to an embodiment.

This system includes a Local Area Network (LAN) 1 serving as a private network. A plurality of IP telephone sets T11 to T1i (i is a natural number) serving as terminals are connected to the LAN 1. It should be noted that each of the IP telephone sets T11 to T1i is a terminal provided with a telephonic communication processing function and media information processing function. Further, the LAN 1 includes a plurality of media channels, and a control channel configured to transmit a control signal necessary for determining the media channel.

Further, an NAT router RT1 and IP telephone apparatus BT serving as a telephone exchange apparatus are connected to the LAN 1. The NAT router RT1 is provided with a translation function of an address between the LAN 1 and an IP network NW serving as a global network.

An NAT router RT2 and IP telephone set T31 are connected to the IP network NW. Furthermore, an IP telephone set T21 is connected to the NAT router RT2. Each of the IP telephone sets T21 and T31 is a terminal provided with a telephonic communication processing function and media information processing function.

The IP telephone apparatus BT has an exchange control function for the plurality of IP telephone sets T11 to T1i, T21, and T31, and NAT routers RT1 and RT2, and management function of addresses assigned to the IP telephone sets T11 to T1i, T21, and T31, and NAT routers RT1 and RT2.

Figures 2, 3:
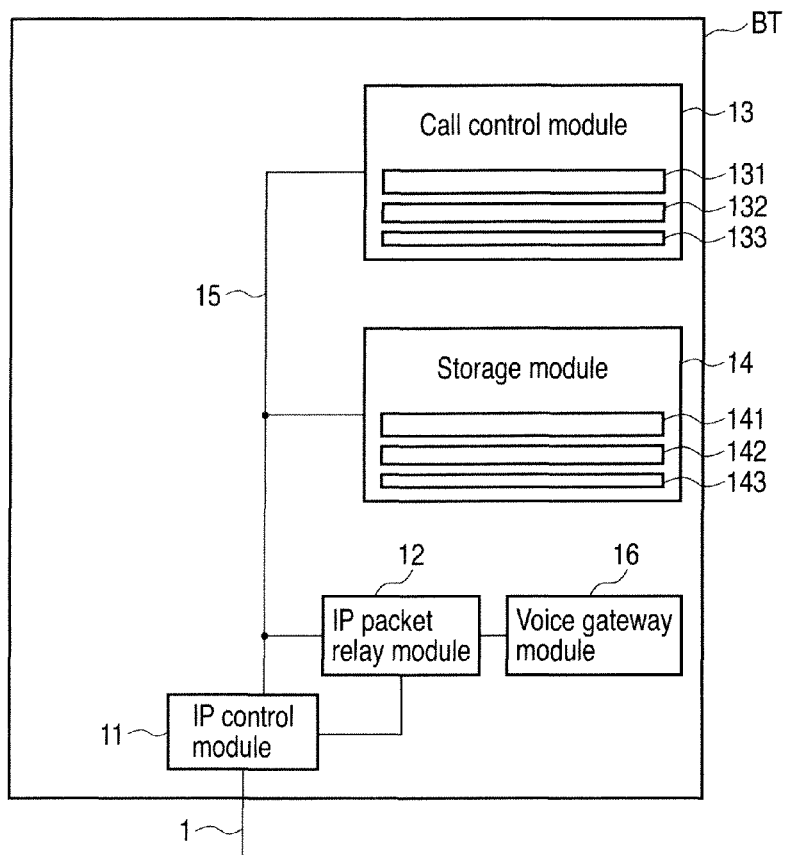
FIG. 2 is a block diagram showing the functional configuration of an IP telephone apparatus shown in FIG. 1.
FIG. 3 is a view showing an example of storage contents of an address map table shown in FIG. 2.

Incidentally, the IP telephone apparatus BT includes the following functions. FIG. 2 is a block diagram showing the configuration.

That is, the IP telephone apparatus BT is provided with an IP control module 11, IP packet relay module 12, call control module 13, and storage module 14. The IP control module 11, IP packet relay module 12, call control module 13, and storage module 14 are connected to each other through a data highway 15.

The LAN 1 is connected to the IP control module 11 as the need arises. The IP control module 11 carries out interface processing between itself and the LAN connected thereto. Further, the IP control module 11 carries out delivery/receipt of various control information items associated with the above interface processing between itself and the call control module 13 through the data highway 15.

A voice gateway module 16 is connected to the IP packet relay module 12. The IP packet relay module 12 is used to process a control packet and voice packet received by the IP control module 11, converts the packet into a PCM signal to output the PCM signal to the voice gateway module 16, and converts a PCM signal from the voice gateway module 16 into a packet to output the packet to the IP control module 11.

The call control module 13 is configured to include a CPU, ROM, RAM, and the like, and carries out control of each module of the IP telephone apparatus BT by software processing.

The storage module 14 stores therein routing information and the like necessary for connection control of the call control module 13.

Incidentally, the storage module 14 is provided with an address map table 141, IP packet relay resource table 142 (hereinafter referred to as a resource table 142), and voice packet transmission destination information table 143 (hereinafter referred to as an information table 143). In the address map table 141, as shown in FIG. 3, a table representing correspondence relationships between extension numbers used as terminal IDs previously assigned to the IP telephone sets T11 to T1i, T21, and T31, external IP addresses, internal IP addresses, and locations each of which is used to specify a network is stored.

Figures 4, 5, 7:
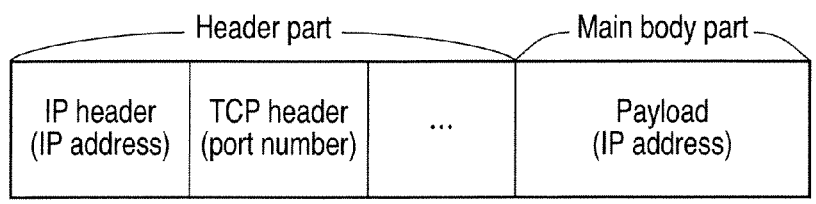
FIG. 4 is a view showing an example of storage contents of an IP packet relay resource table shown in FIG. 2.
FIG. 5 is a view showing an example of storage contents of a voice packet transmission destination information table shown in FIG. 2.
FIG. 7 is a view showing an example of a format of a registration request message used in the embodiment.

In the resource table 142, as shown in FIG. 4, a table representing correspondence relationships between IP packet relay resource numbers, local IP addresses, port numbers, global IP addresses, port numbers, dispatch extension numbers, and relay destination terminal numbers is stored.

In the information table 143, as shown in FIG. 5, a table representing correspondence relationships between extension numbers of the IP telephone sets T11 to T1i, T21, and T31, and voice packet transmission destination information including IP addresses, and RTP port numbers is stored.

On the other hand, the call control module 13 is provided with a registration control module 131, connection control module 132, and update control module 133. When a registration request including an extension number and IP address has been received from the IP telephone sets T11 to T1i, T21, and T31, the registration control module 131 registers, in the address map table 141, the extension number and IP address included in the registration request in such a manner that the extension number and IP address are correlated with each other.

For example, at the time of telephonic communication connection between the IP telephone set T11 and IP telephone set T21, the connection control module 132 refers to the address map table 141 and, when there are, from the reference result, NAT routers RT1 and RT2 between the IP telephone set T11 and IP telephone set T21 which are connected to each other by the telephonic communication, notifies the IP telephone set T21 on the IP network NW side of the IP address and port number of the IP telephone apparatus BT as an address and port number of the destination, and brings the part between the IP telephone set T11 and IP telephone set T21 into the voice gateway module 16 to form a communication link.

When, for example, the IP address and port number of the IP telephone set T13 are changed, the update control module 133 updates the IP address and port number corresponding to the extension number of the IP telephone set T13 in the address map table 141.

Next, an operation to be carried out by the above configuration will be described below.

Figure 6:
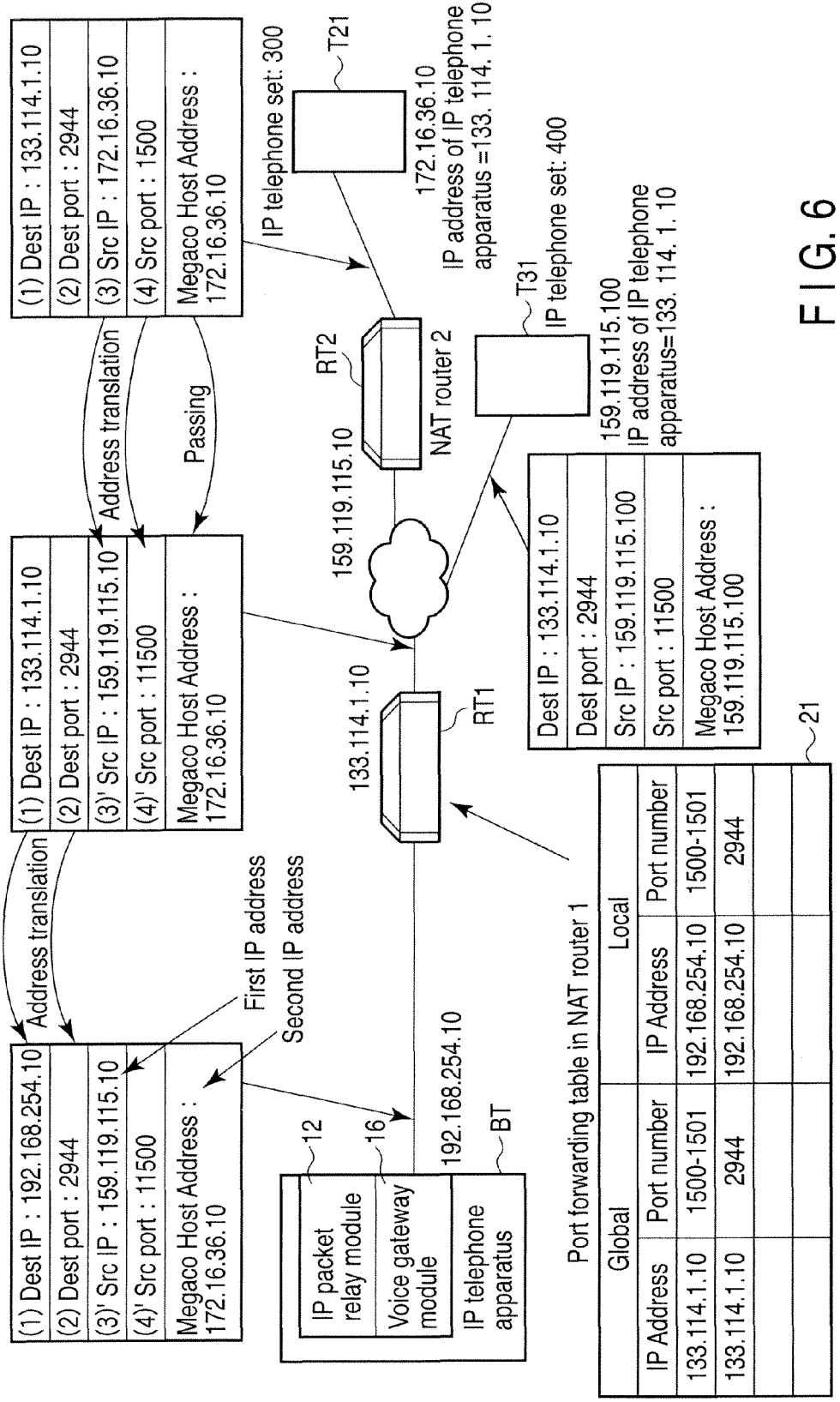
FIG. 6 is a view showing an example of a sequence for carrying out a registration procedure from an IP telephone with respect to an IP telephone apparatus.

FIG. 6 shows an example of a sequence for carrying out a registration procedure with respect to the IP telephone apparatus BT.

The NAT router RT1 has a packet forwarding function, and can transfer an IP packet which has arrived at a global IP address, and port number set in advance to a local network address of a destination set in advance.

In this embodiment, as shown in a port forwarding table 21 in the NAT router RT1 of FIG. 6, setting in which an IP packet brought to the global address (IP address: 133. 114. 1. 10, port number: 1500 to 1501) of the NAT router RT1 is transferred to the IP packet relay module 12 (IP address: 192. 168. 254. 10, port number: 1500 to 1501) of the IP telephone apparatus BT is assumed.

The setting registered in the second entry of the port forwarding table 21 is forwarding setting for call control packets of the IP telephone sets T11 to T1i. Here, the setting in which a MEGACO packet (port number: 2944) is transferred to a MEGACO port of the IP telephone apparatus BT on the premise that the IP telephone supports the MEGACO protocol is shown. A call control packet transmitted from each of the IP telephone sets T11 to T1i, T21, and T31 to the IP telephone apparatus BT is brought to the MEGACO port of the IP telephone apparatus BT by the above setting.

In this embodiment, the port forwarding setting information set in the NAT router RT1 is read and recorded in the resource table 142 in the IP telephone apparatus BT. A global IP address and port number to be forwarded are read from the port forwarding table 21 of the NAT router RT1, are set in the global IP address field of the resource table 142, and the IP address and port number of the forwarding destination are set in the local IP address field.

The IP packet relay module 12 refers to an IP header of the IP packet arrived at the IP port, and rewrites the destination IP address and port number in the header to a destination IP address and port number designated by the IP telephone apparatus BT. The destination network address of the IP packet is rewritten, and the rewritten address is sent to the network interface, whereby an IP packet is transferred to the IP telephone sets T11 to T1i, T21, and T31 on the LAN 1 or on the IP network NW.

In order to transmit a call control signal to the IP telephone sets T11 to T1i, T21, and T31, an IP address of each of the IP telephones is required. In order to transmit a call control signal to the IP telephone T11 connected to the IP telephone apparatus BT through the NAT router RT1, it is necessary to acquire the global IP address and port number of the NAT router RT1.

In this example, an example in which the MEGACO is used as the call control protocol for a call between the IP telephone set T21 and IP telephone apparatus BT is shown.

When the power of the IP telephone set T21 is turned on, and communication with the IP network NW is enabled, a registration procedure is carried out with respect to the IP telephone apparatus BT.

In this procedure, the IP telephone set T21 prepares a registration message constituted of its own extension number and IP address. An IP header of the following contents is attached to the registration message, and the resultant is transmitted to the IP telephone apparatus BT.

(1a) transmission destination IP address=IP address of IP telephone apparatus (set in advance in the IP telephone apparatus BT)
(2a) transmission destination port number=2944
(3a) transmission source IP address=IP address of IP telephone
(4a) transmission source port number=1500

When this registration message passes through the NAT router RT1 or RT2, the message is converted by the address translation function (NAT/NAPT) of the NAT router RT1 or RT2 in the following manner.

(1b) transmission destination IP address=IP address of IP telephone apparatus
(2b) transmission destination port number=2944
(3b) transmission source IP address=global IP address of NAT router
(4b) transmission destination port number=11500 (NAT router assigns a unique number)

When the registration message is brought to the IP telephone apparatus BT, the IP telephone apparatus BT registers the IP address of the IP telephone set T21 in the address map table 141.

It should be noted that in the registration message, an actual IP address of the IP telephone set T21 is inserted in the main body part (data area) as shown in FIG. 7. Further, the IP address of the IP telephone set T21 is also inserted in the IP header part of the registration message as the transmission source IP address.

Here, in the registration message from the IP telephone set T21, the transmission source IP address of the IP header part is converted from the private IP address into the global IP address by the NAT routers RT1 and RT2 through the NAT routers RT1 and RT2.

The IP telephone apparatus BT extracts the IP address of the registration source from the main body part of the received registration message, further extracts the IP address of the transmission source from the IP header part thereof, and accumulates the extracted IP addresses in the address map table 141 in such a manner that the extracted IP addresses are correlated with the extension numbers of the IP telephone set T21. Here, the IP address extracted from the message main body part is made the pre-conversion address, and IP address extracted from the IP header part is made the post-conversion address, and when both the IP addresses differ from each other, t is considered that address translation has been carried out on the registration path.

Figure 8B:
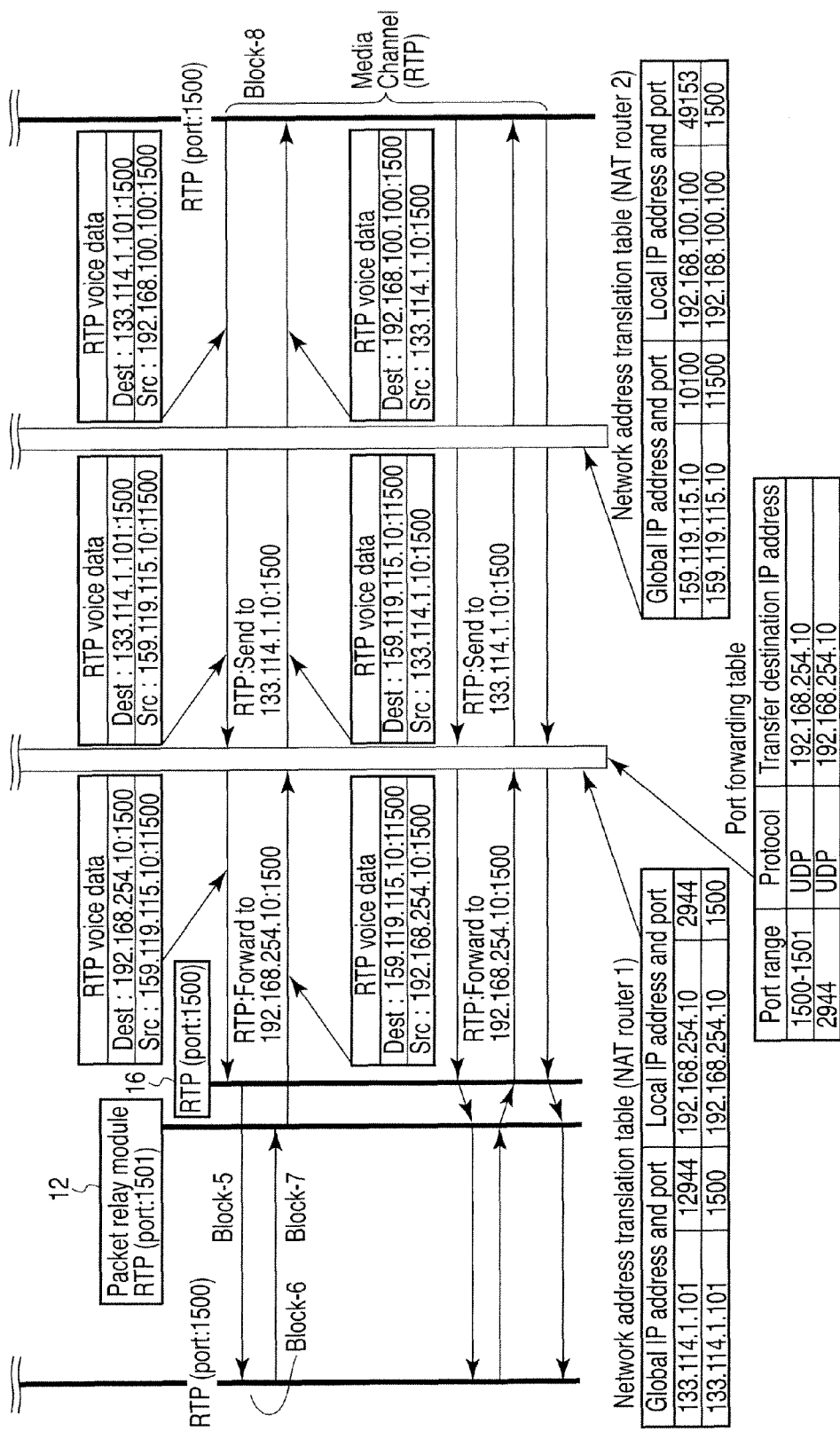
FIG. 8B is a view showing an example of a sequence of a case where IP telephones arranged on two different networks carry out telephonic communication through an IP network and NAT routers.

Next, FIG. 8A and FIG. 8B show an example of a sequence of a case where the IP telephone T11 (200), and IP telephone set T21 (300) arranged on two different networks carry out telephonic communication through the IP network NW and NAT routers RT1 and RT2.

(Block 1)

First, when connection of the communication path of the IP telephone sets T11 and T21 is carried out, the IP telephone apparatus BT refers to the address map table 141 to determine whether or not the IP packet relay module 12 is used in the connection system. This is because when it is not necessary for both the IP telephone sets T11 and T21 to carry out communication through the NAT router RT1, it is not necessary to use the IP packet relay module 12. By doing the above, the frequency of deficiency in the IP packet relay module 12 which is the limited resource is reduced.

When the IP telephone sets T11 and T21 associated with the telephonic communication are connected to networks different from each other in terms of the network location, the IP telephone apparatus BT determines that the IP packet relay module 12 is necessary. At the point at which it is determined that the IP packet relay module 12 is necessary, the IP packet relay resource is secured for the number of speakers (two in the case of two-speaker communication).

The securement of the relay resource is realized by registering the IP telephone number in the dispatch extension number column of the resource table 142, and further registering the IP telephone number of the partner in the relay destination terminal number column. In this example, the extension number "300" is set in the dispatch extension number column of the relay resource number 1, "200" is set in the relay destination terminal column, extension number "200" is set in the dispatch extension number column of the resource number 2, and "300" is set in the relay destination terminal column.

(Block 2)

An RTP information request message is transmitted to the IP telephone set T11 (200) to request the destination IP address and port number of the IP voice packet. The IP telephone set T11 (200) sends its own IP address and RTP port number to the IP telephone apparatus BT in reply to the request.

Further, the IP telephone apparatus BT records the IP address and RTP port number returned from the IP telephone T11 in a field of the voice packet transmission destination information table 143 corresponding to the IP telephone No. 200. In block 5, the above IP address and RTP port number are used in block 5 when an RTP packet is relayed to the IP telephone set T11 (200) as the transmission IP address and port number.

(Block 3)

Subsequently, the IP telephone apparatus BT requests the IP telephone set T21 (300) to transmit an RTP packet thereto. At this time, what is designated as the destination of the IP voice packet are the global IP address (133. 114. 1. 10) and port number (1500) of the IP packet relay module 12. This is because it is determined in block 1 that the IP packet relay resource is used.

The IP telephone set T21 (300) is in the network different from the IP packet relay module 12 according to the address map table 141, and hence the global IP address and port number of the IP packet relay resource can be obtained by referring to the external IP address and port number of the resource number 1 of the IP packet relay resource table 142.

In this example, the IP address becomes 133. 114. 1. 10, and port number becomes 1500. Further, the IP telephone apparatus BT also requests the IP telephone set T11 (200) to transmit an RTP packet thereto. The IP telephone set T11 (200) is in the network identical with the IP packet relay module 12 according to the address map table 141, and hence the destination IP address and port number of the RTP packet transmission request is obtained by referring to the internal IP address and port number of the resource number 2.

(Block 4)

Upon receipt of the RTP packet transmission request, the IP telephone set T21 (300) converts the voice signal into an RTP packet, and transmits the RTP packet to the destination IP address (133. 114. 1. 10) and port number (1500) designated by the RTP packet transmission request.

In the RTP packet transmitted by the IP telephone set T21 (300), the IP address of the transmission source is converted by the NAT router RT2, further the transmission destination IP address and port number are changed by the port forwarding function of the NAT router RT1, and the resultant RTP packet is brought to the IP packet relay module 12.

(Block 5)

When the port number 1500 of the IP packet relay module 12 receives the RTP packet, the IP telephone apparatus BT searches the local IP addresses and port number information field of the IP packet relay resource table 142 by using the destination IP address and port number (1500) written in the IP header of the RTP packet as the search key for the relay destination terminal number (300). The IP telephone apparatus BT further searches the voice packet transmission destination information table 143 by using the relay destination terminal number as the key for the IP address and port number. In order to relay the RTP packet received by the port number 1500 to the IP telephone set T11 (200), the destination IP address and port number in the IP header of the RTP packet are changed to the IP address and port number obtained from the above information table 143.

The transmission source IP address and port number in the IP header of the RTP packet are read and recorded in the field indicated by the relay destination terminal number (300) of the voice packet transmission destination information table 143. The transmission source IP address and port number are referred to in block 7 when an RTP packet is transmitted to the IP telephone set T21 (300). The address-converted RTP packet is transmitted to the network interface.

(Block 6)

The RTP packet the generation source of which is the IP telephone T21 (300) is brought to the IP telephone set T11 (200), and the RTP packet is converted into a voice signal.

On the other hand, the IP telephone T21 (300) has received the RTP transmission request, and hence the IP telephone set T21 converts the voice into an RTP packet, and transmits the RTP packet to the port 10101 of the IP packet relay module 12 designated as the destination.

(Block 7)

When the port number 1501 of the IP packet relay module 12 receives the RTP packet, the call control module 13 of the IP telephone apparatus BT searches the local IP addresses and port number information field of the resource table 142 by using the destination IP address and port number (1501) written in the IP header of the RTP packet as the search key for the relay destination terminal number (IP telephone 300). The call control module 13 further searches the information table 143 by using the relay destination terminal number as the key for the IP address and port number.

Further, in order to relay the RTP packet received by the port number 1501 to the IP telephone set T21 (300), the call control module 13 of the IP telephone apparatus BT changes the destination IP address and port number in the IP header of the RTP packet to the IP address and port number obtained from the above information table 143.

Next, the call control module 13 of the IP telephone apparatus BT searches the relay resource numbers recorded in the dispatch extension number field of the IP packet relay resource table in which the relay destination terminal number obtained from the resource table 142 is recorded for the local IP address and port number of the resource table.

The call control module 13 of the IP telephone apparatus BT sets the local IP address and port number obtained here in the transmission source IP address and port number of the RTP packet. The address-converted RTP packet is transmitted to the network interface.

(Block 8)

The RTP packet transmitted from the IP packet relay resource is brought to the IP telephone set T21 (300) through the NAT routers RT1 and RT2.

By the procedure described above, it becomes possible for the IP telephone set T11 arranged on the LAN 1, and IP telephone set T21 arranged on the IP network NW side to carry out voice communication with each other through the IP packet relay module 12 of the IP telephone apparatus BT arranged on the LAN 1.

For example, in a case where an IP telephone T11 of the office is arranged on the LAN 1, and an IP telephone set T21 is arranged in a SOHO office through the Internet, an IP packet relay module 12 for the IP telephone set T21 arranged in the SOHO office is prepared. At this time, the number of channels of the IP packet relay module 12 corresponding to the number of IP telephones to be arranged in the SOHO office is prepared. When call loss due to channel occupation resulting from use of channels by other persons is not desirable, although it is necessary to prepare the channels of the IP packet relay module 12 twice the number of the IP telephones arranged in the SOHO office, when the call loss can be permitted, it is also possible to reduce the number of channels.

As described above, in the above embodiment, in the NAT router RT1, in order to transfer a voice packet transmitted from the IP network NW to the IP telephone apparatus BT, only the IP address and port number information of the IP telephone apparatus BT are registered in the port forwarding table 21, in the IP telephone apparatus BT, an address map table 141 in which extension numbers of the IP telephone sets T11 to T1i, T21, and T31, IP addresses and port numbers are correlated with each other is provided in the storage module 14, when at the time of telephonic communication connection between the IP telephone sets T11 and T21, there is, as a result of referring to the address map table 141, the NAT router RT1 between the IP telephone sets T11 and T21 connected to each other by the telephonic communication, the IP telephone set T21 arranged on the IP network NW side is notified of the IP address and port number of the apparatus BT as an IP address and port number of the destination, and the communication link between the IP telephone sets T11 and T21 is brought into the voice gateway module 16 to establish telephonic communication connection.

Accordingly, it is not necessary to carry out forwarding setting of all the IP telephone sets T11 to T1i on the LAN 1 with respect to the NAT router RT1, it is enough just to carry out forwarding setting of only the IP telephone apparatus BT, the global IP address can be shared by the NAT router RT1 and IP telephone apparatus BT, whereby it is possible to carry out telephonic communication connection between the IP telephone sets T21 and T31 on the IP network NW, and IP telephone sets T11 to T1i on the LAN 1 while achieving low cost in terms of the system.

That is, by the mediation of the IP packet relay module 12, the number of ports used for relaying IP packets is enough for the number of registration of IP addresses to be registered in the port forwarding table 21, thereby saving the labor of setting.

Further, in the above embodiment, the update control module 133 configured to update the IP address and port number corresponding to the relevant extension number in the address map table 141 when the IP addresses and port numbers of the IP telephone sets T11 to T1i, T21, and T31 are changed is provided in the IP telephone apparatus BT, and hence it is enough just to register once the extension numbers, IP addresses, and port numbers of the IP telephone sets T11 to T1i, T21, and T31 in the address map table 141 of the IP telephone apparatus BT, whereby the address map table 141 is automatically updated to the latest information at all times.

In such a case, when the IP address of the IP packet relay module 12 is fixed in a network environment in which an IP address is delivered to the IP telephone sets T11 to T1i, T21, and T31 according to the DHCP, even if the IP addresses of the IP telephone sets T11 to T1i, T21, and T31 are changed, no change occurs in the port forwarding table 21.

Furthermore, in the above embodiment, by providing, in the IP telephone apparatus BT, a registration control module 131 configured to register the extension number and IP address included in the registration request message in the address map table 141 in such a manner that the extension number and IP address are correlated with each other, for example, when a registration request message including the extension number and IP address is brought from the IP telephone set T31, it is possible to greatly simplify the registration operation.

OTHER EMBODIMENTS

It should be noted that the embodiment is not limited to the above-mentioned embodiment. For example, in the above embodiment, although the example in which the voice gateway module 16 is incorporated in the IP telephone apparatus BT has been described, the voice gateway module 16 may be realized by a voice gateway module to be externally attached to the IP telephone apparatus BT.

Further, in each of the above embodiments, although the example in which the MEGACO is employed has been described, the embodiments can also be applied to, for example, the SIP.

Besides, the configuration of the communication system, functional configuration of the IP telephone apparatus, storage contents of the tables, control procedure of each control operation and contents thereof, and the like can be variously modified and implemented within the scope not deviating from the gist of the embodiment.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication system comprising:
a network address translator (NAT) router configured to connect a private network, and a global network which is arranged in an area broader than the private network; and
a telephone exchange apparatus connected to the private network, and configured to establish communication between terminals, wherein
the NAT router comprises a forwarding table configured to store a data in which an address and port number of the NAT router and an address and port number of the telephone exchange apparatus are correlated with each other, and transfers a communication packet brought from the global network to the telephone exchange apparatus, based on the forwarding table,
the telephone exchange apparatus comprises a memory configured to store a map table in which a terminal ID specifying the terminal, and an address and a port number specifying the network are correlated with each other, and a controller configured to refer to the map table in communication connection between the terminals, determine whether or not there is the NAT router between the terminals connected to each other by the communication based on a reference result of the map table, read out information indicating record contents of the forwarding table from the NAT router, when the controller determines whether there is the NAT router, record information indicating record contents of the forwarding table in a relay resource table, notify the terminal connected to the global network of an address and a port number of the NAT router's own apparatus as an address and a port number of the communication partner based on the relay resource table, and establish the communication path between the terminals via the telephone exchange apparatus.

2. The communication system of claim 1, wherein the telephone exchange apparatus further comprises an updater configured to update the address and the port number corresponding to a relevant terminal ID in the map table, when the address and the port number of the terminal are changed.

3. The communication system of claim 1, wherein, when a registration request including a terminal ID and an address of the terminal is received from the terminal, the telephone exchange apparatus further comprises a register controller configured to register the terminal ID and the address included in the registration request in the map table.

4. A telephone exchange apparatus connected to a Network Address Translator (NAT) router through a private network, and establishing communication between terminals, wherein the NAT router configured to connect the private network, and a global network which is arranged in an area broader than the private network, wherein the NAT router includes a forwarding table configured to store a data in which an address and port number of the NAT router and an address and port number of the telephone exchange apparatus are correlated with each other, comprising:

a memory configured to store a map table in which (i) a terminal ID and (ii) an address and a port number are correlated with each other, and a controller configured to refer to the map table in communication connection between the terminals, determine whether or not there is the NAT router between the terminals connected to each other by the communication based on a reference result of the map table, read out information indicating record contents of the forwarding table from the NAT router, when the controller determines whether there is the NAT router, record information indicating record contents of the forwarding table in a relay resource table, notify the terminal connected to the global network of an address and a port number of the NAT router's own apparatus as an address and a port number of the communication partner based on the relay resource table, and establish the communication path between the terminals via the telephone exchange apparatus.

5. The telephone exchange apparatus of claim 4, further comprising an updater configured to update the address and the port number corresponding to a relevant terminal ID in the map table, when the address and the port number of the terminal are changed.

6. The telephone exchange apparatus of claim 4, further comprising, when a registration request including a terminal ID and an address of the terminal is received from the terminal, a register controller configured to register the terminal ID and the address included in a registration request in the map table.

7. A control method used a telephone exchange apparatus connected to a Network Address Translator (NAT) router through a private network, and establishing communication between terminals, wherein the NAT router configured to connect the private network, and a global network which is arranged in an area broader than the private network, wherein the NAT router includes a forwarding table configured to store a data in which an address and port number of the NAT router and an address and port number of the telephone exchange apparatus are correlated with each other, comprising:

storing a map table in which (i) a terminal ID, and (ii) an address and a port number are correlated with each other, in a memory, referring to the map table in communication connection between the terminals, and determining whether or not there is the NAT router between the terminals connected to each other by the communication based on a reference result of the map table, reading out information indicating record contents of the forwarding table from transfer source NAT router, when the telephone exchange apparatus determines whether there is the NAT router, and recording information indicating record contents of the forwarding table in a relay resource table, and notifying the terminal connected to the global network of an address and a port number of the NAT router's own apparatus as an address and a port number of the communication partner based on the relay resource table, and establish the communication path between the terminals via the telephone exchange apparatus.

8. The control method of claim 7, further comprising updating the address and the port number corresponding to a relevant terminal ID in the map table, when the address and the port number of the terminal are changed.

9. The control method of claim 7, further comprising, when a registration request including a terminal ID and an address of the terminal is received from the terminal, registering the terminal ID and the address included in a registration request in the map table.

* * * * *